United States Patent
Kim

(10) Patent No.: US 11,012,911 B2
(45) Date of Patent: May 18, 2021

(54) METHOD FOR PROCESSING HANDOVER BETWEEN BASE STATIONS SUPPORTING BEAMFORMING AND APPARATUS THEREOF

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/909,898

(22) Filed: Mar. 1, 2018

(65) Prior Publication Data
US 2018/0255496 A1 Sep. 6, 2018

(30) Foreign Application Priority Data

Mar. 3, 2017 (KR) .......................... 10-2017-0027919
Jan. 8, 2018 (KR) .......................... 10-2018-0002228

(51) Int. Cl.
*H04W 36/30* (2009.01)
*H04W 36/38* (2009.01)
*H04W 76/27* (2018.01)
*H04B 7/06* (2006.01)
(Continued)

(52) U.S. Cl.
CPC ........... *H04W 36/30* (2013.01); *H04W 36/38* (2013.01); *H04W 76/27* (2018.02); *H04B 7/0617* (2013.01); *H04W 36/0044* (2013.01); *H04W 36/06* (2013.01); *Y02D 30/70* (2020.08)

(58) Field of Classification Search
CPC ..... H04W 36/30; H04W 36/38; H04W 76/27; H04W 36/06; H04W 36/0044; Y02D 70/10; Y02D 70/00; Y02D 70/21; Y02D 70/1264; Y02D 70/1262; Y02D 70/12; H04B 7/0617
See application file for complete search history.

(56) References Cited

U.S. PATENT DOCUMENTS

| | | | |
|---|---|---|---|
| 2013/0156008 A1* | 6/2013 | Dinan | H04B 7/0456 370/332 |
| 2017/0257816 A1* | 9/2017 | Teyeb | H04W 36/0016 |
| 2018/0132158 A1* | 5/2018 | Tseng | H04L 5/0053 |

(Continued)

FOREIGN PATENT DOCUMENTS

KR 10-2016-0143509 A 12/2016

OTHER PUBLICATIONS

Intel Corporation, "Inter-RAT mobility for NR", R2-168505, 3GPP TSG-RAN WG2 Meeting #96, Reno, USA, Nov. 14-18, 2016, pp. 1-6.

*Primary Examiner* — Walter J Divito
(74) *Attorney, Agent, or Firm* — IP Legal Services, LLC

(57) ABSTRACT

Provided are a method and an apparatus for processing handover between 5G base stations, which support beamforming and interwork with a 5G core network system in a next-generation/radio access network. The method of processing handover in a base station includes: receiving radio quality measurement information on a plurality of cells and on beams of the respective cells from a user equipment; determining whether handover is required based on the radio quality measurement information and transmitting a handover required message to a core network entity when it is determined that handover is required; and receiving a handover command message from the core network entity.

15 Claims, 9 Drawing Sheets

(51) Int. Cl.
*H04W 36/00* (2009.01)
*H04W 36/06* (2009.01)

(56) References Cited

U.S. PATENT DOCUMENTS

2019/0261234 A1* 8/2019 Park .................. H04W 36/0069
2020/0014474 A1* 1/2020 Khirallah ............. H04B 17/309

* cited by examiner

METHOD FOR PROCESSING HANDOVER BETWEEN BASE STATIONS SUPPORTING BEAMFORMING AND APPARATUS THEREOF

CROSS REFERENCE TO RELATED APPLICATION

This application claims priority from Korean Patent Application Nos. 10-2017-0027919 & 10-2018-0002228, filed on Mar. 3, 2017 & Jan. 8, 2018, which are hereby incorporated by reference for all purposes as if fully set forth herein.

BACKGROUND OF THE INVENTION

1. Field of the Invention

The present embodiments relate to a method and an apparatus for processing handover between fifth generation (5G) base stations, which support beamforming and interwork with a 5G core network system in a next-generation/radio access network {hereinafter, referred to as "NR (new radio)" as well}.

2. Description of the Prior Art

Existing long term evolution (LTE) networks support bearer management for interworking with an LTE base station linked to an evolved packet core (EPC), which is a core network, through an S1 interface and application protocols.

Meanwhile, with the introduction of a 5G network, it is urgently required to provide mobility between 5G base stations. Especially, in the case where the 5G base station uses the mmWave frequency of a high frequency band (e.g., 28 GHz), the coverage of the base station is expected to become smaller due to the characteristics of the frequency. Therefore, in this case, a user equipment tends to frequently move between the base stations, and the efficient handover procedure for the same becomes more important.

In addition, the base stations are built on a large scale, and interworking of the same with a 5G core network is essential in 5G. Furthermore, since the base station supports beamforming for transmitting signals to the user equipment in 5G, beamforming should be considered in 5G.

Therefore, the 5G base station directly interworks with a 5G core network, and an efficient handover procedure is required based on an interface between the 5G base station and the 5G core network (which hereinafter may be referred to as "NG") and an NG application protocol (NGAP), which is an application protocol for the corresponding interface.

SUMMARY OF THE INVENTION

The present embodiments provide a method and an apparatus for efficiently performing handover that occurs when a user equipment moves between 5G base stations, which are connected to a 5G core network and support beamforming.

An embodiment, which has been made in order to solve the above-described problems, provides a method of processing handover in a base station, which includes: receiving radio quality measurement information on a plurality of cells and on beams of the respective cells from a user equipment; determining whether handover is required based on the radio quality measurement information and transmitting a handover required message to a core network entity when it is determined that handover is required; and receiving a handover command message from the core network entity.

In addition, another embodiment provides a method of performing handover in a user equipment, which includes: transmitting radio quality measurement information on a plurality of cells and on beams of the respective cells to a first base station; receiving, from the first base station, an RRC connection reconfiguration message, which instructs the user equipment to terminate a connection with the first base station and to perform a connection to a second base station; and performing a connection to the second base station based on the RRC connection reconfiguration message.

In addition, another embodiment provides a base station for processing handover, which includes: a receiver configured to receive radio quality measurement information on a plurality of cells and on beams of the respective cells from a user equipment, and configured to receive a handover command message from a core network entity; and a transmitter configured to determine whether handover is required based on the radio quality measurement information, and configured to transmit a handover required message to the core network entity if it is determined that handover is required.

In addition, another embodiment provides a user equipment for processing handover, which includes: a transmitter configured to transmit radio quality measurement information on a plurality of cells and on beams of the respective cells to a first base station; a receiver configured to receive, from the first base station, an RRC connection reconfiguration message, which instructs the user equipment to terminate a connection with the first base station and to perform a connection to a second base station; and a controller configured to perform a connection to the second base station based on the RRC connection reconfiguration message.

According to the present embodiments, it is possible to efficiently perform handover occurring when a user equipment moves between 5G base stations, which are connected to a 5G core network and support beamforming, thereby providing service continuity and reducing the cost of building and operating a 5G wireless network as well.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
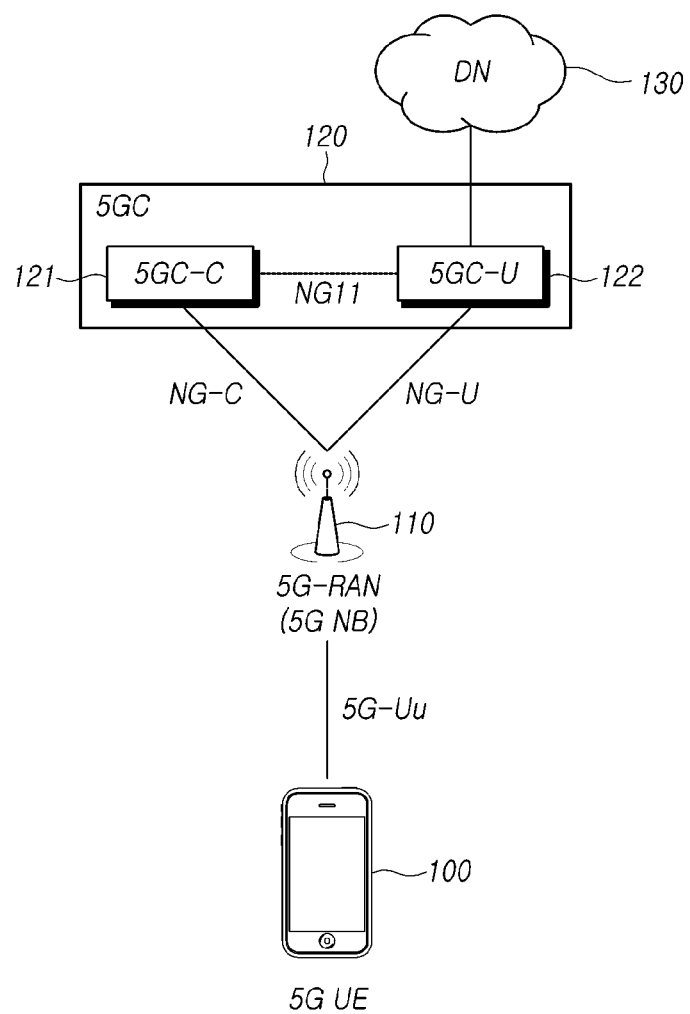
FIG. 1 illustrates a 5G network structure and an NG interface according to at least one embodiment.

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

As used herein, a wireless communication system may mean a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), long term evolution (LTE), high speed packet access (HSPA), international mobile telecommunications (IMT)-2020 (5G or New Radio), and the like, and a MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and means, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or tranceiving point), a Relay Node, a Mega Cell, a Macro Cell, a Micro Cell, a Pico Cell, a Femto Cell, a Remote Radio Head (RRH), a Radio Unit (RU), and a Small Cell.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In 1), all devices that interact with one another to enable the devices that provide a predetermined wireless area to be controlled by an identical entity or to cooperatively configure the wireless area, may be indicated as a base station. Based on a configuration type of a wireless area, a point, a transceiving point, a transmitting point, a receiving point, and the like may be examples of a base station. In ii), a wireless area itself that receives or transmits a signal from a perspective of a terminal or a neighboring base station, may be indicated as a base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications. However, the user equipment and the base station may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using a TDD (Time Division Duplex) scheme that performs transmission based on different times. Such uplink transmission and downlink transmission may also be performed using an FDD (Frequency Division Duplex) scheme that performs transmission based on different frequencies or a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like, and may be configured as a data channel, such as PDSCH (Physical Downlink Shared CHannel), PUSCH (Physical Uplink Shared CHannel), and the like, to transmit data.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation, in which signals are transmitted and received through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signaling includes an RRC signaling that transmits RRC information including an RRC parameter.

A base station performs downlink transmission to user equipments. The base station may transmit downlink control information, such as scheduling or the like, necessary for receiving a downlink data channel, which is a main physical channel for unicast transmission, and a physical downlink control channel for transmitting scheduling approval information for the transmission in an uplink data channel. Hereinafter, the transmission or reception of a signal through each channel will be expressed that a corresponding channel is transmitted or received.

There is no limitation on the multiple access schemes applied to a wireless communication system. Various multiple access schemes may be used. Such various multiple access scheme may include Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, or OFDM-CDMA. Here, the NOMA includes Sparse Code Multiple Access (SCMA) and Low Density Spreading (LDS).

One embodiment of the present disclosure may be applied to resource allocation in asynchronous wireless communication, which has evolved to LTE/LTE-Advanced and IMT-2020 through GSM, WCDMA, and HSPA, and synchronous wireless communication, which has evolved to CDMA, CDMA-2000, and UMB.

In the present specification, a machine-type communication (MTC) user equipment may refer to a user equipment supporting low cost (or low complexity) or a user equipment supporting coverage enhancement. Alternatively, the MTC user equipment may refer to a user equipment that is defined in a specific category for supporting low cost (or low complexity) and/or coverage enhancement.

In other words, the MTC user equipment in the present specification may refer to a newly defined 3GPP Release-13 low cost (or low complexity) UE category/type for performing LTE-based MTC-related operations. Alternatively, the MTC user equipment in the present specification may refer to a UE category/type defined under the existing 3GPP Release-12 or a newly defined Release-13 low cost low (or low complexity) UE category/type, which supports enhanced coverage over the existing LTE coverage or supports low power consumption. Alternatively, the MTC user equipment may refer to a further enhanced MTC user equipment defined in Release-14.

In the present specification, a NarrowBand Internet of Things (NB-IoT) user equipment means a user equipment that supports radio access for the cellular IoT. The purpose of the NB-IoT technology includes improved indoor coverage, support for large-scale low-rate user equipments, low latency sensitivity, low-priced user equipments, low power consumption, and an optimized network architecture.

Enhanced Mobile Broadband (eMBB), massive Machine Type Communication (mMTC), and Ultra Reliable and Low Latency Communication (URLLC) have been proposed as typical usage scenarios in the NR (new radio), which is under discussion in 3GPP.

In the present specification, a frequency, a frame, a subframe, a resource, a resource block, a region, a band, a subband, a control channel, a data channel, a synchronization signal, various reference signals, various signals, and various messages in relation to the NR (new radio) may be interpreted as having meanings that have been used in the past or are used at present, or as having various meanings that will be used in the future.

The present embodiment discloses structures of a 5G core network and a 5G base station, an NG interworking interface between a 5G core network and a 5G base station (hereinafter, referred to as "between CN-RAN"), a handover procedure based on an NG application protocol (NGAP), messages, and related information elements.

The 5G network is divided into a 5G core network (hereinafter, referred to as "5GC", "5G CN", "NGC", or the like) and a 5G radio access network (hereinafter, referred to as "NG-RAN", "5G-RAN", or the like). The NG-RAN may include a set of 5G NBs (gNBs), which are one or more 5G base station nodes. An entity constituting the above-described core network may be referred to as a core network entity. The core network entity may mean a 5GC-C or a 5GC-U, which will be described below, or may mean a set of one or more 5GC-Cs and 5GC-Us.

FIG. 1 illustrates a 5G network structure and an NG interface according to an embodiment.

Referring to FIG. 1, a 5G core network (5GC) 120 may include a 5GC-C 121 and a 5GC-U 122, and the 5GC-U 122 may be connected to an external data network (DN) 130. The 5GC 120 and a 5G-RAN (hereinafter, referred to as a "5G NB" as well) 110 may interwork with each other through an NG (or N2/N3) interface, and one or more 5G NBs may be individually connected to one 5GC.

At this time, a 5GC-C (hereinafter, referred to as "5G CN-C" or "AMF" as well) 121 for managing a control plane of the 5GC and a 5GC-U (hereinafter, referred to as "5G CN-U", "UPF", or "UPGW" as well) 122 for managing a user plane of the 5GC. The NG-RAN 110 may interwork with each other through an NG-C user interface and an NG-U interface, respectively. In particular, the 5GC-C 121 performs mobility control.

Meanwhile, the 5G NB may be further divided into a central unit (CU) device and a distributed unit (DU) device, and one or more DUs may be connected to one CU. In addition, a DU may include a transceiver for performing beamforming, and the DU may transmit a plurality of beams, wherein the respective beams may be identified by means of a beam identifier (beam ID or BID). Furthermore, the NG-C interface may be used for a connection between the 5GC-C 121 and the 5G-RAN 110, and the NG-U interface may be used for a connection between the 5GC-U 122 and the 5G-RAN 110.

A 5G user equipment (UE) 100 is equipped with both a 5G wireless transceiver and a wireless protocol. The 5G UE 100 may be connected to the 5G NB (or a DU constituting the NB) 110 by means of a 5G wireless interface (5G-Uu).

Figure 2:
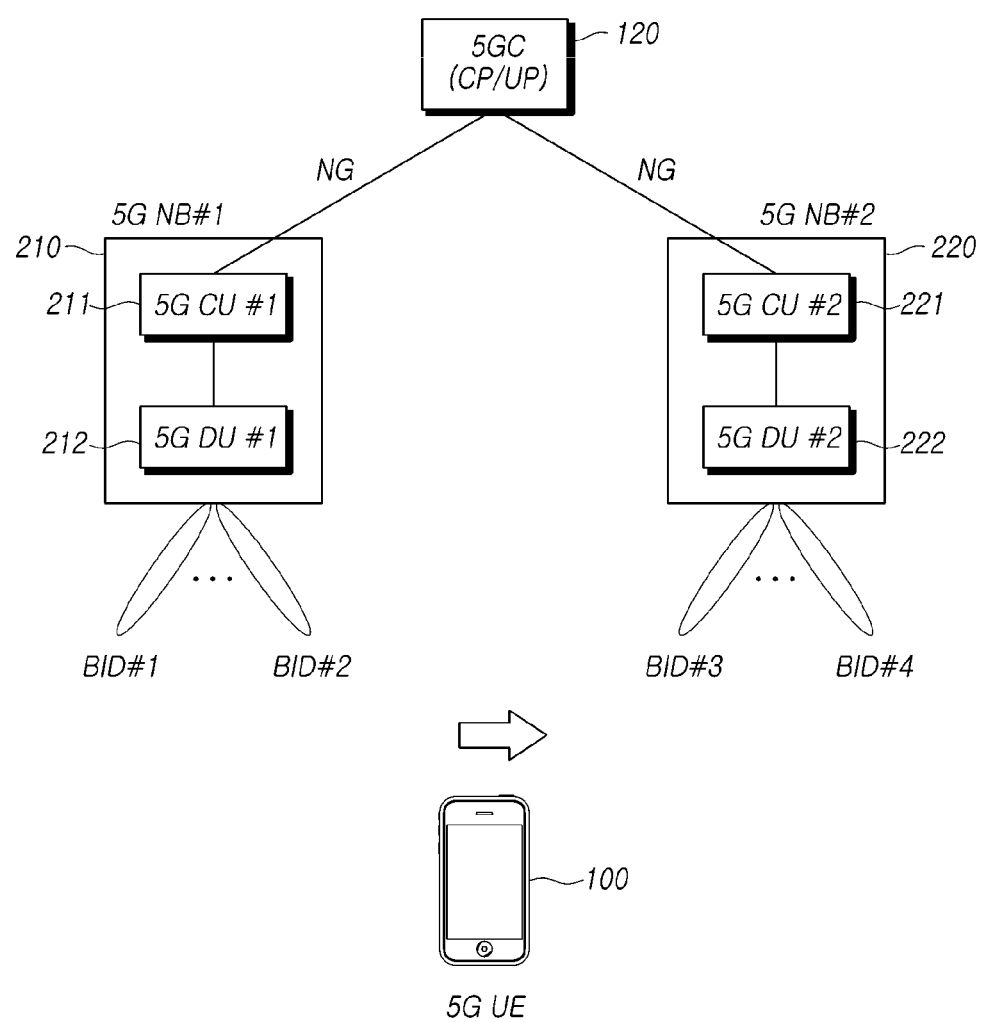
FIG. 2 is a diagram illustrating handover between 5G base stations, which are connected to a 5G core network and support beamforming, according to an embodiment.

FIG. 2 is a diagram illustrating handover between 5G base stations, which are connected to a 5G core network and support beamforming, according to an embodiment.

Referring to FIG. 2, a 5G UE 100 is connected to a 5G NB #1 (210), which is a 5G base station. The 5G NB #1 (210) includes a 5G CU #1 (211), which is a CU, and a 5G DU #1 (212), which is a DU. The 5G DU #1 (212) may perform beamforming, thereby transmitting a plurality of beams. The 5G UE 100 is connected to the 5G NB #1 (210) through a BID #2 among the beams transmitted by the 5G DU #1 (212).

Now, a process of handover, which occurs when the 5G UE 100 moves to the location of the 5G NB #2 (220), will be described. The 5G NB #2 (220) includes a 5G CU #2 (221), which is a CU, and a 5G DU #2 (222), which is a DU. The 5G DU #2 (222) may perform beamforming, thereby transmitting a plurality of beams. When the handover is performed, the 5G UE 100 detaches from the 5G NB #1 (210) and connects to the 5G NB #2 (220) through a BID #3.

Both the 5G NB #1 (210) and the 5G NB #2 (220) may be connected to the 5GC 120, which is a core network. As described above with reference to FIG. 1, the 5GC 120 may include a 5GC-C for managing a control plane and a 5GC-U for managing a user plane. The 5G CU #1 (211) of the 5G NB #1 (210) and the 5G CU #2 (221) of the 5G NB #2 (220) may be connected to the 5GC 120 through an NG interface. Therefore, the connection between the user equipment and the 5GC 120 is maintained even if handover occurs due to the movement of the user equipment.

That is, when the user equipment moves and handover occurs, a 5G base station is changed so that a serving CU, a serving DU, and a serving beam are changed (5G NB #1→5G NB #2, 5G CU #1→5G CU #2, 5G DU #1→5G DU #2, and BID #2→BID #3) while the connection with the 5GC remains unchanged.

The embodiments described below may be applied to a user equipment, a base station, and a core network entity, which use all of the mobile communication technologies. For example, the embodiments of the present disclosure may be applied to a next-generation mobile communication (5G mobile communication or New-RAT) user equipment, a base station, and an Access and Mobility Function (AMF).

Hereinafter, a base station may represent a base station (a CU, a DU, or an entity implemented as a single logical entity with a CU and a DU) and a gNB in a 5G wireless network in which a CU (Central Unit) and a DU (Distributed Unit) are separated. As described above, the core network entity may represent, as a component of a 5G core network, a 5GC-C for managing a control plane or a 5GC-U for managing a user plane.

In addition, an NG application protocol (NGAP) message means a message transmitted and received through the NGAP.

Figure 3:
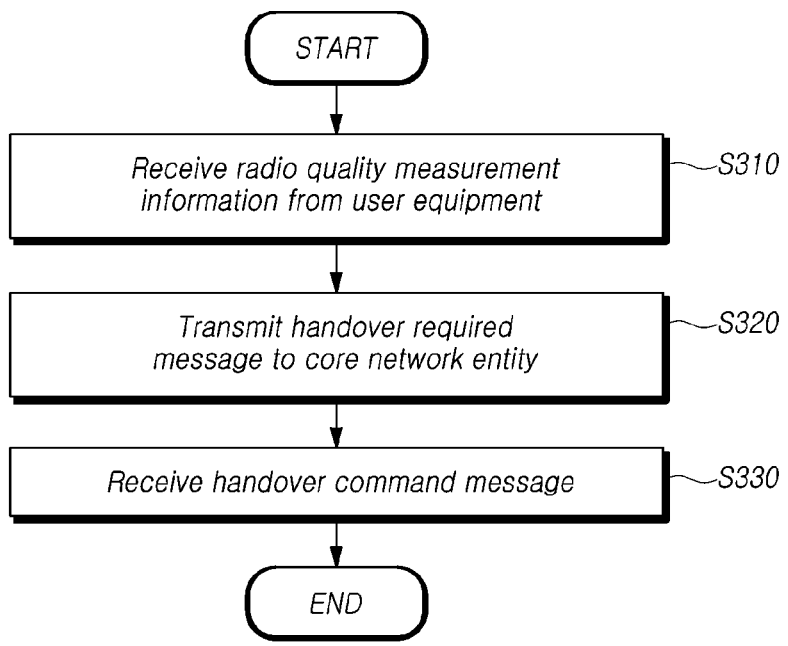
FIG. 3 is a flowchart illustrating a procedure in which a base station processes handover according to an embodiment.

FIG. 3 is a flowchart illustrating a handover procedure of a base station processes handover according to an embodiment.

Referring to FIG. 3, a base station may receive, from a user equipment, radio quality measurement information on a plurality of cells and on beams of the respective cells (S310).

A user equipment moving between a plurality of base stations supporting beamforming may receive signals for a plurality of cells and for beams of the respective cells. The user equipment may measure radio quality information on the corresponding cell and on beams of each cell. The user equipment may generate radio quality measurement information to be transmitted to the base station.

For example, the radio quality measurement information may include information on the signal intensity of the beam. The signal intensity of the beam may be defined as BRSRP, which is reference signal received power (RSRP) in a beam unit. As another example, the radio quality measurement information may be defined as a ratio of the signal intensity of the beam to the reception signal intensity of an interference beam. In addition, the radio quality measurement information may further include RSRP for each cell.

The radio quality measurement information may include information on the beam having the best signal quality for the respective cells. That is, the user equipment may transmit, to the base station, information on one beam having the best signal quality for each cell, among information on a plurality of cells and on beams for the respective cells.

Alternatively, the radio quality measurement information may include information on N beams having high signal quality for the respective cells. That is, the user equipment may select, for each cell, N best beams in descending order of signal quality from among the beams of the respective cells. Then, the user equipment may transmit information on the N selected beams to the base station. Here, N may be i) a positive number of 1 or more, ii) a predetermined value, or iii) a predetermined number indicated by the base station.

Alternatively, the radio quality measurement information may include information on beams having a signal quality higher than a predetermined threshold signal quality for each cell. That is, the user equipment may select beams having a signal quality higher than a predetermined threshold signal quality for each cell from among the beams of the respective cells. Then, the user equipment may transmit information on the selected beams to the base station. Here, the value of the threshold signal quality may be indicated by the base station.

Alternatively, the radio quality measurement information may include information on all of the beams in the respective cells. That is, the user equipment may select all of the beams in the respective cells without any condition. Then, the user equipment may transmit information on the selected beams to the base station.

At this time, the base station may give the user equipment an indication of the number of beams to be included in the radio quality measurement information. That is, the user equipment may transmit, to the base station, only the information on the beams corresponding to the number of beams indicated by the base station using the radio quality measurement information.

Next, the base station may determine whether or not handover is required based on the radio quality measurement information received from the user equipment. If it is determined that handover is required, the base station may transmit a handover required message to a core network entity (S320).

At this time, the handover required message may include information on the cause of the handover.

When the core network entity receives the handover required message, the core network entity transmits a handover request message to a target base station, thereby allowing the target base station to perform a subsequent handover procedure. A detailed description of the corresponding procedure will be made in the embodiment, which will be described later.

Subsequently, the base station may receive a handover command message from the core network entity (S330).

The handover required message or the handover command message may include at least one of i) handover type information, ii) source-to-target transparent container information, iii) a QoS flow identifier for the user equipment, and iv) QoS flow parameters.

The handover type is a parameter for describing the type of handover, and, for example, a type "Intra5G" is used in the 5G.

The source-to-target transparent container information refers to a radio information element of a user equipment, which is transmitted from a source base station to a target base station while performing handover. The source-to-target transparent container information is transmitted from the source base station to the target base station via a core network entity, and the core network entity forwards the information to the target base station without reading the information.

The QoS flow identifier for the user equipment may represent a unique identifier for the QoS flow supported by the 5G. Such a QoS flow identifier for the user equipment may include a related 5G radio access bearer (RAB) ID.

The QoS flow parameters refer to QoS-related parameters applied to the 5G QoS flow. In this case, the QoS flow parameters may include i) an identifier of the QoS flow, ii) a transmission rate (minimum value/guaranteed value/maximum value) of the QoS flow, iii) information on the characteristics of the QoS {the type of GBR (guaranteed bit rate)/non-GBR (non-guaranteed bit rate) depending on whether or not a specific bandwidth is guaranteed, priority, packet delay, a packet error rate, or the like}, iv) allocation and retention priority (ARP) information, and the like.

Figure 4:
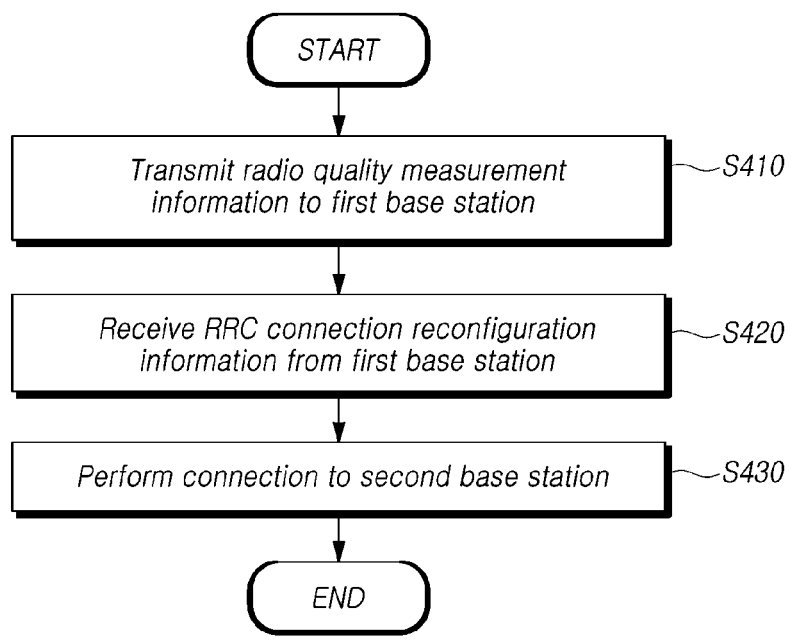
FIG. 4 is a flowchart illustrating a procedure in which a user equipment performs handover according to an embodiment.

FIG. 4 is a flowchart illustrating a handover procedure of a user equipment performs handover according to an embodiment.

Referring to FIG. 4, the user equipment may measure radio quality for a plurality of cells and beams of the respective cells, and the user equipment may transmit, to the first base station, radio quality measurement information on the corresponding cell and beams (S410). The first base station means a base station that is currently connected to the user equipment. The first base station may be referred to as a source base station. The first base station may determine whether or not handover is required based on the radio quality measurement information received from the user equipment.

For example, the radio quality measurement information may include information on the signal intensity of the beam. The signal intensity of the beam may be defined as BRSRP, which is reference signal received power (RSRP) in a beam unit. As another example, the radio quality measurement information may be defined as a ratio of the signal intensity of the beam to the reception signal intensity of an interference beam.

The radio quality measurement information may include information on the beam having the best signal quality for the respective cells. That is, the user equipment may transmit, to the first base station, information on one beam having the best signal quality for each cell, among information on a plurality of cells and on beams for the respective cells.

The radio quality measurement information may include information on N beams having a high signal quality for the respective cells. That is, the user equipment may select N best beams for each cell in descending order of signal quality from among the beams of the respective cells. Then, the user equipment may transmit information on the N selected beams to the first base station. Here, N may be i) a positive number of 1 or more, ii) a predetermined value, or iii) a predetermined number indicated by the first base station.

Alternatively, the radio quality measurement information may include information on beams having a signal quality higher than a predetermined threshold signal quality for each cell. That is, the user equipment may select beams having a signal quality higher than a predetermined threshold signal quality for each cell from among the beams of the respective cells. Then, the user equipment may transmit information on the selected beams to the first base station. Here, the value of the threshold signal quality may be indicated by the first base station.

Alternatively, the radio quality measurement information may include information on all of the beams for the respective cells. That is, the user equipment may select all of the beams for the respective cells without any condition. Then, the user equipment may transmit information on the selected beams to the first base station.

At this time, the first base station may give the user equipment an indication of the number of beams to be included in the radio quality measurement information. That is, the user equipment may transmit, to the first base station, only the information on the beams corresponding to the number of beams indicated by the first base station using the radio quality measurement information.

Next, the user equipment may receive, from the first base station, an RRC connection reconfiguration message that instructs the user equipment to terminate the connection with the first base station and to perform a connection with a second base station (S420). The second base station means a target base station to which the user equipment performs a new connection while performing handover.

In addition, the user equipment may perform a connection with the second base station, based on the RRC connection reconfiguration message (S430). That is, the user equipment may terminate the connection with the first base station, and the user equipment may perform a new connection with the second base station.

Additional embodiments of a process for processing handover between 5G base stations, which interwork with a 5G core network system and support beamforming, will be described in detail.

The embodiments described below may be applied individually or by means of a combination thereof.

Embodiment 1: Radio Quality Measurement/Report Process

A 5G user equipment may report radio quality measurement information on cells and beams in the cells, which is received from neighboring 5G NBs, to a serving 5G NB (hereinafter, referred to as a "source 5G NB" as well) (that is, a currently connected base station) by transmitting a 5G radio measurement report message.

The 5G user equipment may transmit i) a radio quality measurement result for one candidate beam having the best signal quality, ii) a plurality of candidate beams, or iii) all of the beams for each cell. At this time, the 5G user equipment may report a cell quality measurement result (e.g., RSRP) together with the same.

In addition, when the serving 5G NB make a request to the user equipment for reporting the radio quality measurement information, the serving 5G NB may designate the number of beams to be reported, and the serving 5G NB may give the user equipment an indication of the same. As an example of a unit for measuring the signal quality of the beam, BRSRP, which is RSRP in a beam unit, may be used.

Embodiment 2: Handover Preparation Process

The serving 5G NB may determine whether or not handover is required based on the reported radio quality measurement information.

The serving 5G NB transmits a handover required message to a 5G CN-C, which is a core network entity for managing a control plane, to provide notification that handover to a target 5G NB (that is, a target base station, to which the user equipment performs a new connection) is required.

The handover required message may include a cell group ID (CGI) of the target 5G NB or a cause IE, which is information indicating the cause of the handover.

Figure 5:
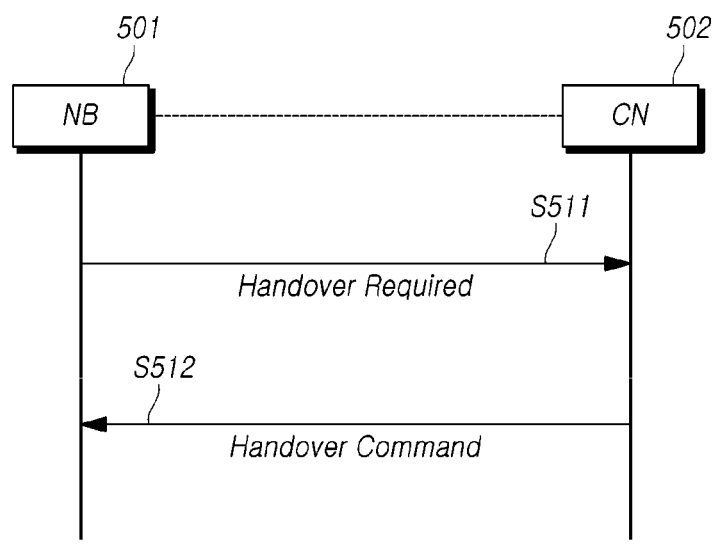
FIG. 5 is a diagram illustrating an example of a handover message transmitted and received between a base station and a core network entity according to an embodiment.

FIG. 5 is a diagram illustrating an example of transmission and reception of a handover message between a base station and a core network entity according to an embodiment.

Referring to FIG. 5, an NB 501, which is a 5G base station, and a CN 502, which is a 5G core network entity, are connected by means of an NG interface, which is an interworking interface between a 5G core network and an NB. An NG application protocol (NGAP) control message and information may be exchanged bidirectionally through the corresponding interface.

The NB 501 transmits a handover required message to the CN 502 (S511). The CN 502 performs handover-related processes and transmits a handover command message to the NB 501 (S512).

After receiving the handover required message from the serving 5G NB, the 5G CN-C transmits a handover request message to the target 5G NB. When the target 5G NB receives the handover request message, an NG bearer or an NG QoS flow, which is a tunnel to the core network entity 5G CN-U for managing a user plane in the target 5G NB, may be generated. In particular, when the NG QoS flow is required to be used, it may be generated by mapping a radio bearer with a QoS flow or by converting the same into the QoS flow. A radio bearer ID may be used for identifying the radio bearer, and a flow ID may be used for identifying the QoS flow.

The target 5G NB may transmit a handover request acknowledgement message to the 5G CN-C, and the 5G CN-C may transmit an indirect data forwarding tunnel creation request message to the 5G CN-U through an NG11 interface (the interface between the 5G CN-C and the 5G CN-U), thereby creating an NG tunnel from the 5G CN-U to the target 5G NB.

Thereafter, the 5G CN-C may transmit a handover command message to the source 5G NB, thereby creating a tunnel between the source 5G NB and the 5G CN-U.

Figure 6:
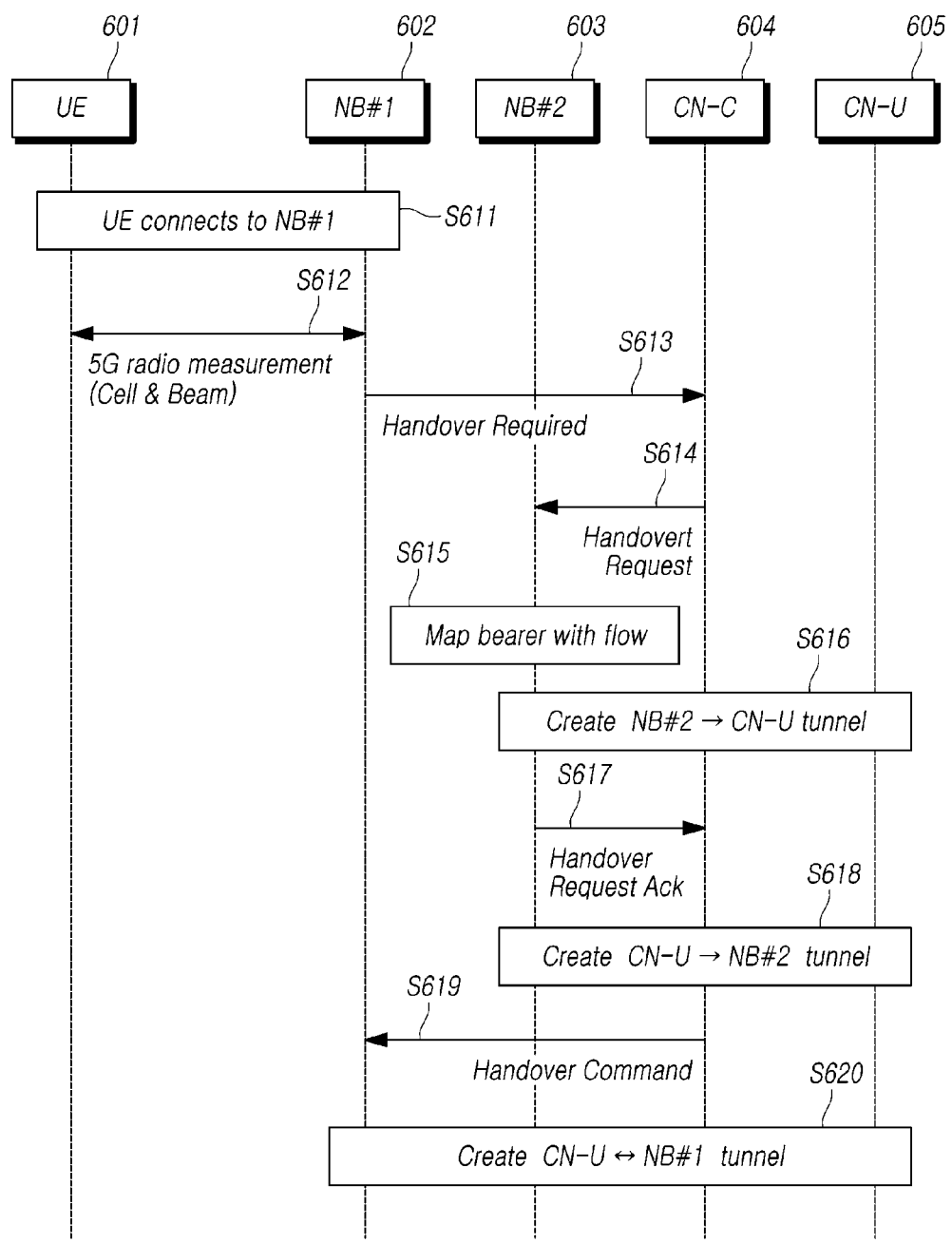
FIG. 6 is a diagram illustrating a radio quality measurement/reporting process and a handover preparation process according to an embodiment.

FIG. 6 is a diagram illustrating a radio quality measurement/report process and a handover preparation process according to an embodiment.

Referring to FIG. 6, a UE 601, which is a 5G user equipment, is connected to an NB #1 (602), which is a serving 5G NB (source NB) (S611). The UE 601 reports radio quality measurement information on the measured cells and beams in the cells by transmitting a 5G radio measurement report message (S612).

When the NB #1 (602) determines that handover is necessary based on the radio quality measurement information received from the UE 601, the NB #1 (602) transmits a handover required message to a CN-C 604, which is a core network entity for managing a control plane (S613). When the handover required message is received, the CN-C 604 transmits a handover request message to a NB #2 (603), which is a target base station 5G NB to which the user equipment performs a new connection.

In the case where the NG QoS flow is required to be used as described above, the NB #2 (603) may map a radio bearer with a QoS flow or may convert the same into the QoS flow (S615).

Next, a tunnel from the NB #2 (603) to the CN-U 605, which is a core network entity for managing a user plane, is created (S616).

Then, the NB #2 (603) transmits a handover request acknowledgement message to the CN-C 604 (S617). Thereafter, a tunnel from the CN-U 605 to the NB #2 (603) is created (S618).

Subsequently, the CN-C 604 transmits a handover command message to the NB #1 (602) (S619). Thereafter, a tunnel between the NB #1 (602) and the CN-U 605 is created (S620).

Embodiment 3: Handover Execution Process

The source 5G NB may transmit an RRC connection reconfiguration message to the user equipment to instruct the same to connect to a target NB. The user equipment may detach from the source 5G NB, and the user equipment may perform a new connection to the target 5G NB.

Embodiment 4: Handover Completion Process

The target 5G NB may notify the 5G CN-C that handover has been successful by transmitting a handover notification message.

Then, the 5G CN-C may transmit a bearer modification request message to the 5G CN-U to allow the data to be directly transmitted from the 5G CN-U to the target 5G NB.

Thereafter, since the tunnel between the source 5G NB and the 5G CN-U is not necessary, the 5G CN-C transmits, to the 5G NB, a UE context release command message in order to release the same. Meanwhile, when the handover required to be canceled, the source 5G NB may transmit a handover cancellation message to the 5G CN-C, thereby cancelling the handover preparation process.

Figure 7:
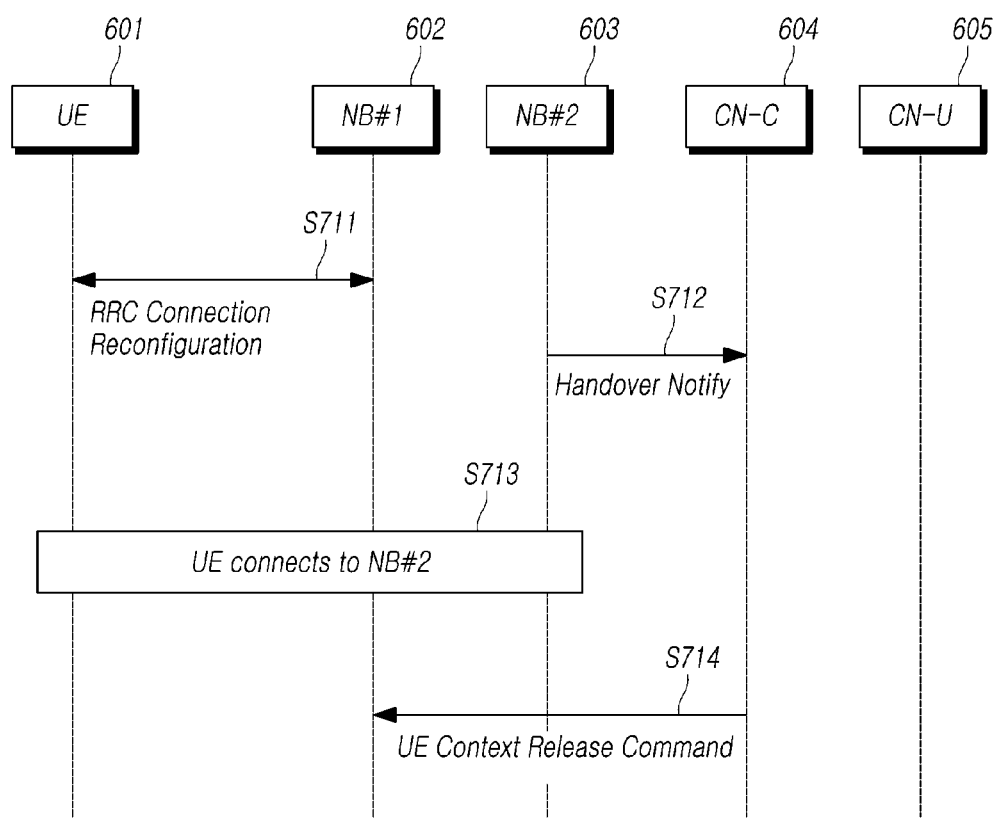
FIG. 7 is a diagram illustrating a handover execution process and a handover completion process according to an embodiment.

FIG. 7 is a diagram illustrating a handover execution process and a handover completion process according to an embodiment. The processes in FIG. 7 may be performed after the process in FIG. 6 is completed.

Referring to FIG. 7, the NB #1 (602), which is a serving 5G NB (e.g., source NB), transmits an RRC connection reconfiguration message to the UE 601, which is a 5G user equipment (S711). The UE 601 may detach from the NB #1 (602), which is a source 5G NB, and the UE 601 may perform a new connection to the NB #2 (603), which is a target 5G NB.

Thereafter, the NB #2 (603) transmits a handover notification message to the CN-U 604 to provide notification that handover has been successful (S712). Then, the UE 601 connects to the NB #2 (603) (S713).

Subsequently, in order to release the tunnel between the source NB and the CN-U, the CN-C (604) transmits a UE context release command message to the NB #1 (602) (S714).

In this case, the handover-related messages used in FIG. 6 and FIG. 7, such as a handover required message, a handover command message, a handover command acknowledgement message, a handover notification message, or a UE context release command message, may be NG application protocol (NGAP) messages.

NGAP IE (Information Element)

Information elements (IEs) used in the NG-based handover procedure comply with most of the IEs used in S1AP of the LTE, and the following types (or values) may be added or modified to then be included in the message used while performing handover {a combination of the following types (or values) may be included in the message, and the respective types (or values) may be used requisitely or selectively for a specific NGAP message}.

1) Handover Type: Type "Intra5G" is used.
2) Cause: Type "NG 5G Handover" is used.
3) 5G CGI (cell group ID) or 5G BGI (beam group ID): This includes a PLMN ID, a cell ID (CID), and a beam ID (BID). The size of the BID may be allocated statically or dynamically depending on the number of supported beams. If the 5G NB does not support beamforming, no BID information is used. In addition, this may include only the cell ID (CID) and the beam ID (BID), excluding the PLMN ID.
4) Source-to-Target Transparent Container (or Source 5G NB-to-Target 5G NB Transparent Container): A used target cell ID is indicated as a 5G CGI.
5) UE Radio Capability: Type "5G frequency" may be added (e.g., 28 GHz band).
6) RAT Type: Type "5G" is used as a radio access technique. 5G BF/5G Non-BF values may be used depending on whether or not the beamforming radio technology is supported.
7) Global 5G NB ID: This means a global identifier of the 5G NB. In the case where a CU and a DU are separated, a CU device ID (CU ID) and a DU device ID (DU ID) may be included. In addition, a Global CU ID and a Global DU ID may be separately defined and used. In this case, this may include a PLMN ID, a 5G NB ID, and a CU/DU ID.
8) SGCN-C UE NGAP ID: This means a unique identifier for UE connection through an NG interface in the 5G CN-C.
9) SGNB UE NGAP ID: This means a unique identifier for UE connection through an NG interface in the 5G NB. In addition, a unique identifier for the UE connection via an NG interface in the CU and a unique identifier of the UE connection via an NG interface in the DU may use a CU UE NGAP ID and a DU UE NGAP ID, respectively.

10) SGNB TEID: This means a GTP tunnel endpoint ID (GTP-TEID) of the 5G NB. Additionally, a CU TEID and a DU TEID, which are GTP tunnel endpoint IDs of the CU and the DU, respectively, may be used.

11) 5G RAB ID: This means a unique identifier of a radio access bearer for a specific user equipment (similar to an E-RAB ID).

12) 5G Flow ID: This means a unique identifier of a QoS flow for a specific user equipment. Here, the 5G flow ID may include a related 5G RAB ID.

13) 5G Flow Level QoS Parameters: These mean QoS-related parameters applied to the 5G flow. A QoS flow ID, which is used for classifying and identifying flows having different QoS characteristics, may be included.

14) TAI: This means a tracking area identifier. This includes a PLMN ID, a tracking area code (TAC), and a RAN-TAC (RAN-level TAC). The RAN-TAC may be selectively added.

15) 5G UE Type: This may be used to identify the type of connected 5G user equipment. That is, this may be used to distinguish between a standalone user equipment, a stand-alone-based interworking user equipment, a non-standalone-based interworking user equipment, and an LTE-only user equipment.

As described above, it is possible to provide service continuity and to drastically reduce costs for 5G radio network establishment and operation by supporting handover mobility between 5G base stations, which interwork with a 5G core network system and support beamforming, using the NG interface of the present embodiment.

Figure 8:
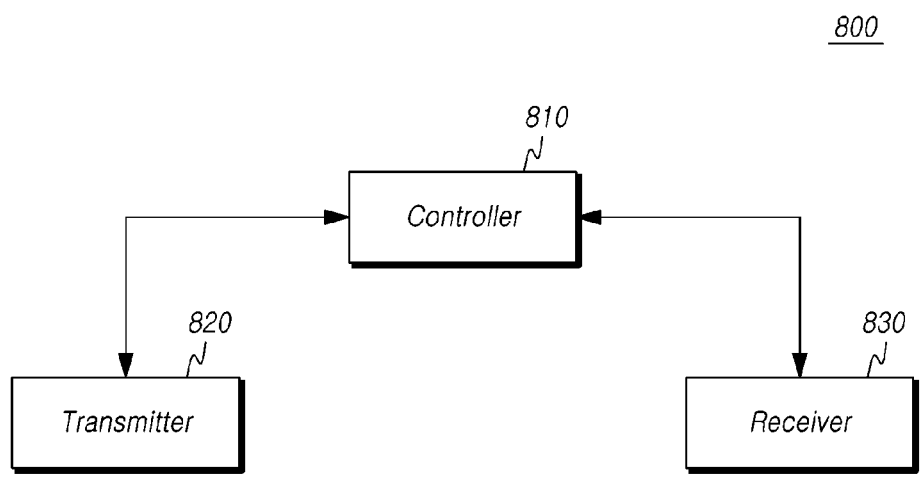
FIG. 8 is a diagram illustrating the configuration of a base station according to at least one embodiment.

FIG. 8 is a diagram illustrating a base station according to an embodiment.

Referring to FIG. 8, a base station 800 includes a controller 810, a transmitter 820, and a receiver 830.

The controller 810 controls the overall operations of the base station in order to support handover that occurs when the user equipment moves between 5G base stations supporting beamforming, which are connected to a 5G CN necessary for performing the embodiments described above.

The transmitter 820 and the receiver 830 may transmit and receive signals, messages, and data, which are necessary for realizing the embodiments described above, to and from the user equipment.

More specifically, the transmitter 820 may determine whether or not handover is required based on radio quality measurement information received from the user equipment. If it is determined that the handover is required, the transmitter 820 may transmit a handover required message to the core network entity.

A user equipment moving between a plurality of base stations supporting beamforming may receive signals of a plurality of cells and beams of the respective cells. The user equipment may measure radio quality information on the corresponding cell and the beams of each cell, and the user equipment may then generate radio quality measurement information to be transmitted to the base station.

For example, the radio quality measurement information may include information on the signal intensity of the beam. The signal intensity of the beam may be defined as BRSRP, which is reference signal received power (RSRP) in a beam unit. As another example, the radio quality measurement information may be defined as a ratio of the signal intensity of the beam to the reception signal intensity of an interference beam.

The radio quality measurement information may include information on a beam having the best signal quality for the respective cells. That is, the user equipment may transmit, to the base station, information on one beam having the best signal quality for each cell, among information on a plurality of cells and on beams for the respective cells.

Alternatively, the radio quality measurement information may include information on N beams having the signal quality for the respective cells. That is, the user equipment may select N best beams for each cell in descending order of signal quality from among the beams of the respective cells. Then, the user equipment may transmit information on the N selected beams to the base station. Here, N may be i) a positive number of 1 or more, ii) a predetermined value, or iii) a predetermined number indicated by the base station.

Alternatively, the radio quality measurement information may include information on beams having a signal quality higher than a predetermined threshold signal quality for each cell. That is, the user equipment may select beams having a signal quality higher than a predetermined threshold signal quality for each cell from among the beams of the respective cells. Then, the user equipment may transmit information on the selected beams to the base station. Here, the value of the threshold signal quality may be indicated by the base station.

Alternatively, the radio quality measurement information may include information on all of the beams in the respective cells. That is, the user equipment may select all of the beams in the respective cells without any condition, and may transmit information on the selected beams to the base station.

At this time, the base station may give the user equipment an indication of the number of beams to be included in the radio quality measurement information. That is, the user equipment may transmit, to the base station, only the information on the beams corresponding to the number of beams indicated by the base station using the radio quality measurement information.

At this time, the handover required message may include a CGI (Cell Group ID) of a target base station, to which the user equipment performs a new connection, or cause information of the handover.

When the core network entity receives the handover required message, the core network entity transmits a handover request message to the target base station in order to allow the target base station to perform a handover procedure.

The receiver 830 may receive, from the user equipment, radio quality measurement information on a plurality of beams, which is measured by the user equipment, and the receiver 830 may receive a handover command message from the core network entity.

At this time, the handover required message or the handover command message may include at least one of i) handover type information, ii) source-to-target transparent container information, iii) a QoS flow identifier for the user equipment, and iv) QoS flow parameters.

The handover type is a parameter for describing the type of handover, and, for example, a type "Intra5G" is used in the 5G.

The source-to-target transparent container information refers to radio information elements of a user equipment, which are transmitted from a source base station to a target base station while performing handover. The source-to-target transparent container information is transmitted from the source base station to the target base station via a core network entity, and the core network entity forwards the information to the target base station without reading the information.

The QoS flow identifier for the user equipment may represent a unique identifier for the QoS flow supported by 5G, and may include a related 5G RAB ID.

The QoS flow parameters refer to QoS-related parameters applied to the 5G QoS flow. In this case, the QoS flow parameters may include i) an identifier of the QoS flow, ii) a transmission rate (minimum value/guaranteed value/maximum value) of the QoS flow, iii) information on the characteristics of the QoS {the type of GBR (guaranteed bit rate)/non-GBR (non-guaranteed bit rate) depending on whether or not a specific bandwidth is guaranteed, priority, packet delay, a packet error rate, or the like}, iv) allocation and retention priority (ARP) information, and the like.

Figure 9:
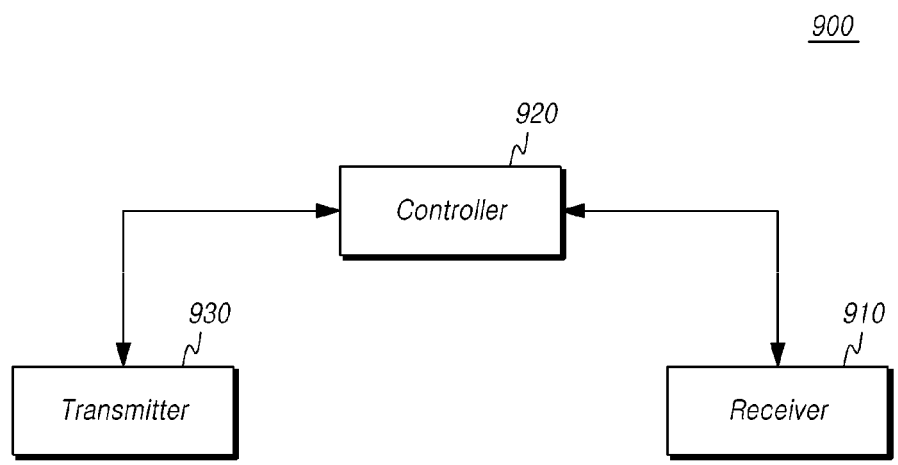
FIG. 9 is a diagram illustrating the configuration of a user equipment according at least one embodiment.

FIG. 9 is a diagram illustrating a user equipment according to an embodiment.

Referring to FIG. 9, a user equipment 900 includes a receiver 910, a controller 920, and a transmitter 930.

The receiver 910 may receive, from a first base station, an RRC connection reconfiguration message that instructs the user equipment to terminate the current connection with the first base station and to perform a connection to a second base station.

The transmitter 920 may transmit radio quality measurement information, which is obtained by measuring radio quality for a plurality of cells and beams of the respective cells, to the first base station connected to the user equipment.

For example, the radio quality measurement information may include information on the signal intensity of the beam. The signal intensity of the beam may be defined as BRSRP, which is reference signal received power (RSRP) in a beam unit.

As another example, the radio quality measurement information may be defined as a ratio of the signal intensity of the beam to the reception signal intensity of an interference beam.

The radio quality measurement information may include information on a beam having the best signal quality for the respective cells. That is, the user equipment may transmit, to the first base station, information on one beam having the best signal quality for each cell, among information on a plurality of cells and on beams for the respective cells.

The radio quality measurement information may include information on N beams having the best signal quality for the respective cells. That is, the user equipment may select N best beams for each cell in descending order of signal quality from among the beams of the respective cells. Then, the user equipment may transmit information on the N selected beams to the first base station. Here, N may be i) a positive number of 1 or more, ii) a predetermined value, or iii) a predetermined number indicated by the first base station.

Alternatively, the radio quality measurement information may include information on beams having a higher signal quality than a predetermined threshold signal quality for each cell. That is, the user equipment may select beams having a higher signal quality than a predetermined threshold signal quality for each cell from among the beams of the respective cells. Then, the user equipment may transmit information on the selected beams to the first base station. Here, the value of the threshold signal quality may be indicated by the first base station.

Alternatively, the radio quality measurement information may include information on all of the beams for the respective cells. That is, the user equipment may select all of the beams for the respective cells without any condition, and may transmit information on the selected beams to the first base station.

At this time, the first base station may give the user equipment an indication of the number of beams to be included in the radio quality measurement information. That is, the user equipment may transmit, to the first base station, only the information on the beams corresponding to the number of beams indicated by the first base station using the radio quality measurement information.

The controller 930 may perform a connection to the second base station, based on the RRC connection reconfiguration message received from the first base station.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method of processing handover in a base station, the method comprising:
   receiving radio quality measurement information on a plurality of cells and on beams of the respective cells from a user equipment;
   determining whether handover is required based on the radio quality measurement information on the beams of the respective cells and transmitting a handover required message to a core network entity when it is determined that handover is required; and
   receiving a handover command message from the core network entity,
   wherein the radio quality measurement information comprises one of i) information on a beam having a best signal quality for each cell, ii) information on N beams having a high signal quality for each cell, iii) information on beams having a signal quality higher than a predetermined threshold signal quality for each cell, and iv) information on all of the beams in each cell, and
   wherein the base station gives the user equipment an indication of a number of beams to be included in the radio quality measurement information,
   wherein the user equipment receive the indication of the number of beams to be included in the radio quality measurement information, selects the indicated number of the beams for each cell, and transmit the information on the indicated number of the beams for each cell,
   wherein at least one of the handover required message and the handover command message comprises at least one of i) handover type information, ii) source-to-target transparent container information, iii) a Quality of service (QoS) flow identifier for the user equipment, and iv) a QoS flow parameter, and wherein the QoS flow parameter includes an identifier of the QoS flow, information on characteristics of the QoS, and allocation and retention priority (ARP) information.

2. The method of claim 1, wherein the handover required message comprises cause information of handover.

3. The method of claim 1, wherein the determining whether handover is required based on the radio quality measurement information comprises:
   determining whether handover is required based on information on all of the beams for the respective cells.

4. The method of claim 1, wherein the determining whether handover is required based on the radio quality measurement information further comprise:
   determining whether handover is required based on a ratio of i) signal intensity of a beam to reception signal intensity of an interference beam.

5. The method of claim 1, wherein the determining whether handover is required based on the radio quality measurement information further comprises:
   determining whether handover is required based on information on a beam having a best signal quality for each cell,
   wherein the user equipment transmits the information on a beam having a best signal quality for each cell to the base station.

6. The method of claim 1, wherein the determining whether handover is required based on the radio quality measurement information comprises:
   determining whether handover is required based on information on N beams having a high signal quality for each cell,
   wherein the user equipment selects N best beams for each cell in a descending order of signal quality from beams of each cell and transmits the information on the N selected beams having the high signal quality of each cell to the base station, where N is one of i) a positive number of 1 or more, ii) a predetermined value, and iii) a predetermined number indicated by the base station.

7. The method of claim 1, wherein the determining whether handover is required based on the radio quality measurement information comprises:
   determining whether handover is required based on information on beams having a signal quality higher than a predetermined threshold signal quality of each cell,
   wherein the user equipment selects beams having a signal quality higher than a predetermined threshold signal quality for each cell and transmits the information on the beams having a signal quality higher than a predetermined threshold signal quality of each cell, where the predetermined threshold signal quality is indicated by the base station.

8. A method of performing handover in a user equipment, the method comprising:
   transmitting radio quality measurement information on a plurality of cells and on beams of the respective cells to a first base station;
   receiving, from the first base station, a radio resource control (RRC) connection reconfiguration message, which instructs the user equipment to terminate the connection with the first base station and to perform a connection to a second base station; and
   performing a connection to the second base station based on the RRC connection reconfiguration message,
   wherein the radio quality measurement information comprises one of i) information on a beam having a best signal quality for each cell, ii) information on N beams having a high signal quality for each cell, iii) information on beams having a signal quality higher than a predetermined threshold signal quality for each cell, and iv) information on all of the beams in each cell,
   wherein the user equipment receives an indication of a number of beams to be included in the radio quality measurement information from the first base station, select the indicated number of beams among beams of each cell and transmit information on the selected beams to the first base station,
   wherein the first base station transmits a handover required message to a core network entity when the handover is decided to performed based on the radio quality measurement information, receives a handover command message from the core network entity,
   wherein at least one of the handover required message and the handover command message comprises at least one of i) handover type information, ii) source-to-target transparent container information, iii) a Quality of service (QoS) flow identifier for the user equipment, and iv) a QoS flow parameter, and
   wherein the QoS flow parameter includes an identifier of the QoS flow, information on characteristics of the QoS, and allocation and retention priority (ARP) information.

9. A base station for processing handover, the base station comprising:
   a receiver configured to receive radio quality measurement information on a plurality of cells and on beams of the respective cells from a user equipment, and configured to receive a handover command message from a core network entity; and
   a transmitter configured to determine whether handover is required based on the radio quality measurement information on the beams of the respective cells, and configured to transmit a handover required message to the core network entity if it is determined that handover is required,
   wherein the radio quality measurement information comprises one of i) information on a beam having a best signal quality for each cell, ii) information on N beams having a high signal quality for each cell, iii) information on beams having a signal quality higher than a predetermined threshold signal quality for each cell, and iv) information on all of the beams in each cell,
   wherein the base station gives the user equipment an indication of a number of beams to be included in the radio quality measurement information,
   wherein the user equipment receive the indication of the number of beams to be included in the radio quality measurement information, selects the indicated number of the beams for each cell, and transmit the information on the indicated number of the beams for each cell,
   wherein at least one of the handover required message and the handover command message comprises at least one of i) handover type information, ii) source-to-target transparent container information, iii) a Quality of service (QoS) flow identifier for the user equipment, and iv) a QoS flow parameter, and
   wherein the QoS flow parameter includes an identifier of the QoS flow, information on characteristics of the QoS, and allocation and retention priority (ARP) information.

10. The base station of claim 9, wherein the handover required message comprises cause information of handover.

11. The base station of claim 9, wherein the transmitter is configured to: determine whether handover is required based on information on all of the beams for the respective cells.

12. The base station of claim 9, wherein the transmitter is configured to: determine whether handover is required based on a ratio of i) signal intensity of a beam to reception signal intensity of an interference beam.

13. The base station of claim 9, wherein the transmitter is configured to: determine whether handover is required based on information on a beam having a best signal quality for each cell, wherein the user equipment transmits the information on a beam having a best signal quality for each cell to the base station.

14. The base station of claim 9, wherein the transmitter is configured to: determine whether handover is required based on information on N beams having a high signal quality for each cell, wherein the user equipment selects N best beams for each cell in a descending order of signal quality from beams of each cell and transmits the information on the N selected beams having the high signal quality of each cell to the base station, where N is one of i) a positive number of 1 or more, ii) a predetermined value, and iii) a predetermined number indicated by the base station.

15. The base station of claim 9, wherein the transmitter is configured to determine whether handover is required based on information on beams having a signal quality higher than a predetermined threshold signal quality of each cell, wherein the user equipment selects beams having a signal quality higher than a predetermined threshold signal quality for each cell and transmits the information on the beams having a signal quality higher than a predetermined threshold signal quality of each cell, where the predetermined threshold signal quality is indicated by the base station.

\* \* \* \* \*